March 9, 1943.  W. D. HALLORAN  2,313,065
TIMING MECHANISM
Filed Aug. 27, 1938  2 Sheets-Sheet 1
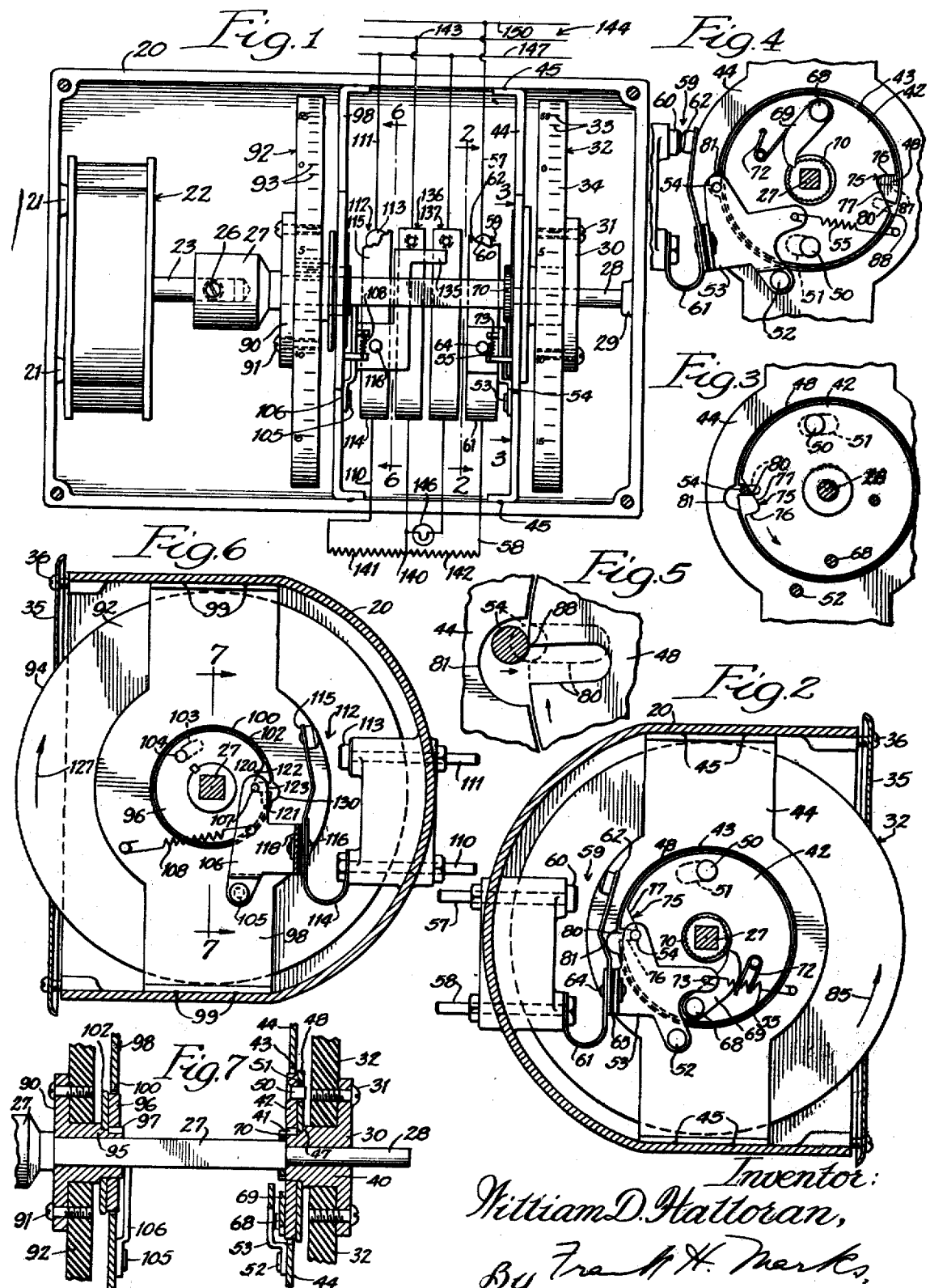
Inventor:
William D. Halloran,
By Frank H. Marks,
Attorney.

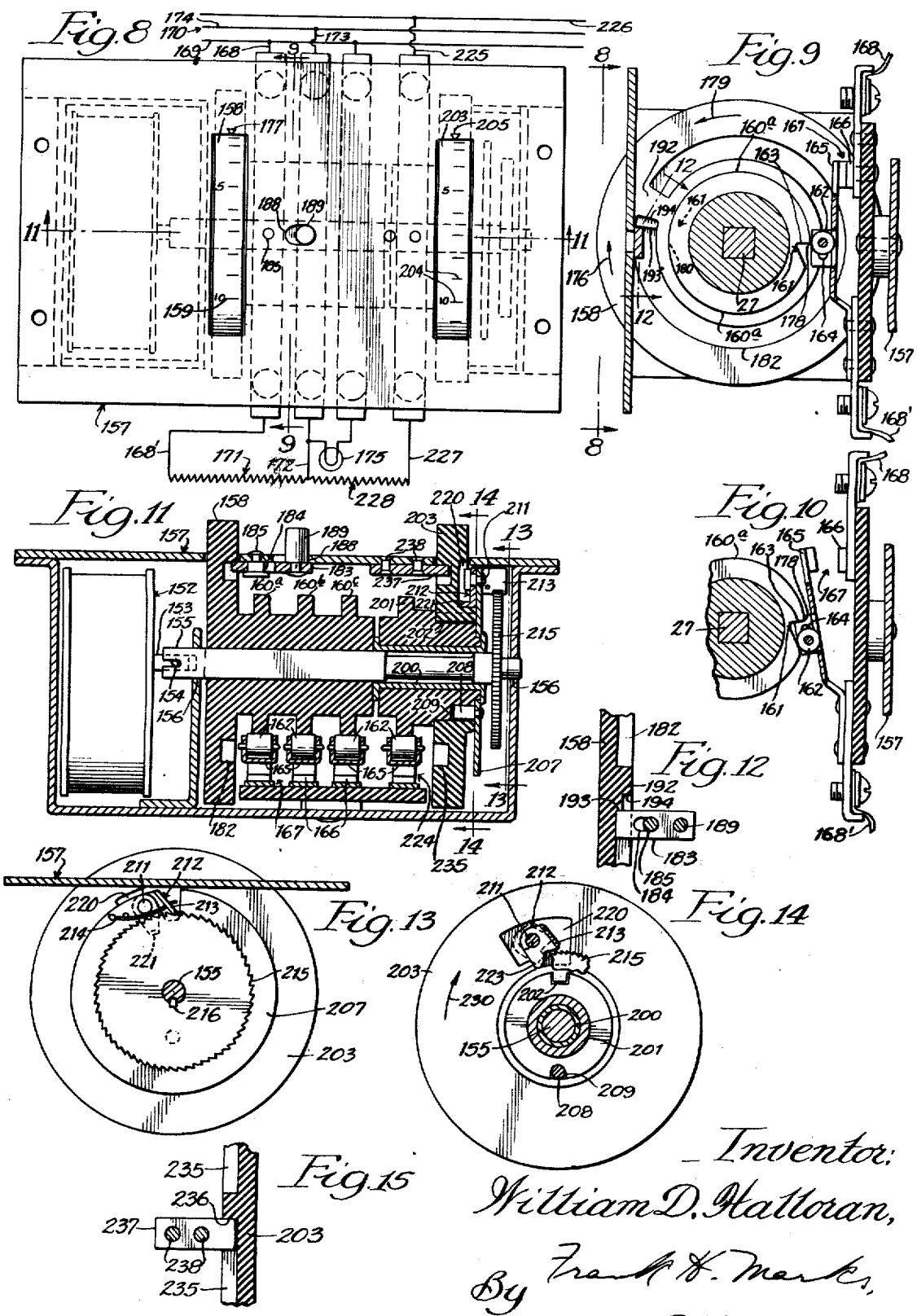

Patented Mar. 9, 1943

2,313,065

UNITED STATES PATENT OFFICE 2,313,065

TIMING MECHANISM

William D. Halloran, River Forest, Ill., assignor to Sears, Roebuck and Co., Chicago, Ill., a corporation of New York Application August 27, 1938, Serial No. 227,048

6 Claims. (Cl. 200—35)

This application pertains to controls, and is concerned more particularly with, but not limited to, the control of heating devices including stoves or ranges.

It is an object of my invention to provide an improved automatic control for a heating device whereby it may be made to furnish heat of a given intensity for a given length of time.

It is another object of the invention to provide a control for a heat transfer device which will enable the same to function automatically at different temperatures for different time intervals.

It is a further object of the invention to provide a control automatically operative to cause a device to operate first in one condition for a given time interval and then, at the close of that interval, to operate under a different condition for a given time interval.

It is also an object to provide, in an apparatus such as a cooking stove, a control including a timer which may be manually set to cause a stove to deliver heat for a predetermined time interval at one temperature and automatically at the end of that interval to deliver heat at another temperature.

A further object is to provide a control mechanism automatically operative to maintain a device in different conditions at different times, and to automatically stop operation of the device.

Another object is to provide a control automatically operative to maintain a device in one condition of operation for a given length of time and to maintain the device thereafter in another condition of operation for an indefinite length of time.

A further object is to provide a control for selectively maintaining a device in one condition of operation for definite and indefinite periods.

It is another object to provide an improved quick-break switch.

Further objects and advantages of the invention will appear as the description proceeds.

The invention may be better understood upon reference to the following description and accompanying drawings, in which:

Fig. 1 is a section elevation of a control mechanism constructed in accordance with one form of my invention.

Fig. 2 is a transverse sectional view taken as indicated by the line 2—2 in Fig. 1.

Fig. 3 is a fragmentary transverse sectional view taken as indicated by line 3—3 in Fig. 1, but with the parts in a different adjustment.

Fig. 4 is a fragmentary transverse sectional view similar to Fig. 2, but with the parts in still another adjustment.

Fig. 5 is a fragmentary sectional view showing details of a switch control mechanism at the make or break of the switch.

Fig. 6 is a transverse sectional view taken as indicated by the line 6—6 in Fig. 1.

Fig. 7 is a fragmentary longitudinal sectional view taken as indicated by line 7—7 in Fig. 6.

Fig. 8 is a view similar to Fig. 1 but of a modified form of the invention, taken as indicated by the line 8—8 in Fig. 9.

Fig. 9 is a transverse sectional view taken as indicated by the line 9—9 in Fig. 8.

Fig. 10 is a fragmentary sectional view similar to Fig. 9 but with the parts in a different adjustment.

Fig. 11 is a longitudinal sectional view taken as indicated by the line 11—11 in Fig. 8.

Fig. 12 is a fragmentary sectional view taken as indicated by the line 12—12 in Fig. 9.

Fig. 13 is a sectional view of a dial stop taken as indicated by the line 13—13 in Fig. 11.

Fig. 14 is a sectional view taken as indicated by the line 14—14 in Fig. 11.

Fig. 15 is a view similar to Fig. 12 but shows a stop for the other dial.

Referring now more particularly to the form of invention illustrated for exemplary purposes in Figs. 1 to 7, there is provided a suitable casing 20 on which is mounted as at 21 a clock 22 having a spring (not shown) which is operatively connected with a staff 23, also preferably connected to the hour hand (not shown) of the clock. Coupled to the staff 23 for rotation therewith, as at 26, is a shaft 27, the other end 28 of which is suitably journaled as at 29. A hub 30 is mounted for rotation independently of the shaft 27. Secured to the hub as at 31 is a dial 32 preferably having time graduations 33 at its periphery 34 and arranged so that an arcuate portion thereof always projects through an escutcheon plate 35 mounted as at 36 on the casing. The graduations are preferably in minutes, although they may be in other units if desired, and the plate 35 preferably has a datum point (not shown) marked thereon for use in connection with such graduations.

The hub 30 has a sleeve extension 40 on which is keyed as at 41 or otherwise fastened for rotation therewith a cam plate 42 disposed within an opening 43 in a bracket 44 welded as at 45 or otherwise suitably secured to the casing 20. The sleeve 40 has a shoulder 47 between which and the plate 42 a second plate 48 is rotatably mounted, the plate 48 having a diameter preferably somewhat exceeding that of the plate 42. The cam plate 42 has a lug 50 projecting into an arcuate slot 51 in the plate 48 so that limited relative rotation between the two plates is possible.

Pivotally mounted as at 52 on the bracket 44 is a lever 53 having a pin 54 urged by a spring 55 to ride on the peripheries of the plates 42 and 48.

An electric circuit which may include heating elements, as will appear, for a stove, for example, includes connections 57 and 58 and a switch indicated generally at 59 and comprising a stationary contact 60, a spring 61, and a switch blade 62 normally urged away from the contact 60 by said spring. The switch blade and spring are preferably connected as at 64 with, and insulated as at 65 from, the lever 53, so that the spring 55 assists the spring 61 in urging the switch blade to open position.

Pivotally mounted as at 68 on the cam plate 42 is a pawl 69 adapted to engage a ratchet 70 suitably mounted on the shaft 27 for rotation therewith. The pawl 69 is urged toward the ratchet 70 by a spring 72 carried by the cam 42 and, under certain circumstances, the pawl is held out of engagement with the ratchet by a pin 73 carried by the lever 53, the spring 55, or the combined effect of the springs 55 and 61, being greater than the opposing effect of the spring 72.

The cam 42 has a notch 75 having an abrupt, preferably radial drop surface 76 and a relatively gradually inclined cam surface 77. The plate 48 has a substantially radial slot 80 of a size to accommodate the follower 54.

It will now be apparent that by turning the graduated disk 32 in the direction of the arrow 85 (Fig. 2), the cam 42 will rotate therewith so that the cam surface 77 will force the pin 54 radially outward until the pin 50 has fully taken up its lost motion in the slot 51. By this time the pin 54 will be engaged with the outer periphery of the cam 42. The upright 44 has a recess 81 into which the follower is projected by this operation. This action takes place against the force of the springs 55 and 61 and, as a result, the switch blade 62 is brought into engagement with the switch contact 60, closing a circuit of a heating element for a stove or the like, as will appear.

While the lever 53 is being cammed by the plate 42, the spring 72 moves the pawl 69 into engagement with the ratchet 70. As the rotation of the dial 32 is continued, the pawl transmits the rotary motion to the ratchet 70, which in turn transmits the motion to the shaft 27, thereby winding up the spring in the clock 22. Fig. 3 shows the arrangement of parts just before the completion of movement of the pin 50 in the slot 51 and just before the pin 54 has reached its outermost position. Fig. 4 shows the arrangement of parts after the disk 32 has been rotated one-half revolution, for example, so that the corresponding heat element will be on for, say, one-half hour. When the disk 32 is released at the desired adjustment, the clock spring turns the ratchet 70 which, acting upon the pawl 69 and pin 68, turns the cam 42 and dial 32 independently of the plate 48 in a clockwise direction until the pin 50 is at the left end of the slot 51 as seen in Fig. 4, and the slot 80 is in full register with the slot 75, as indicated in dotted lines at 87. Thereafter the plate 48 turns with the plate 42 as a unit. As this rotation continues, the follower 54 rides the outer periphery of the plate 48 free of the cam surface 77.

The follower 54 may be of any desired transverse shape. For illustrative purposes it is shown round. Its passage from the corner 88 of the slot 80 as shown in full lines in Fig. 5 fully into said slot as shown in dotted lines in Fig. 5, takes an appreciable period of time, so that if the switch 59 were set to commence to open as the follower commenced to move radially inward, the opening of the switch blade would be slow and, before many operations, the switch points would be burned and rendered useless. In accordance with the present invention the switch is initially closed substantially before the follower 54 reaches its radially outermost position— for example, when it is in the position shown is dotted lines in Fig. 5—so that when the follower is at its outermost position (full lines, Fig. 5), the spring 61 has been flexed to a greater extent than is required to effect engagement between the contact 60 and the switch blade 62, so that the switch engagement therebetween is under pressure. Accordingly, during the aforesaid time interval, the switch remains fully closed, and the switch does not open until the follower is substantially completely aligned with the slot 80, as shown in dotted lines in Fig. 5, so that its movement radially therein is precipitous and thus the opening of the switch is practically instantaneous, resulting from the excess of the force of the springs 55 and 61 over the force of the spring 72.

It will be observed that while the follower is riding the periphery of the plate 48, the pin 73 is spaced from the pawl 69 so that there is no interference with the operation of the pawl in cooperation with the ratchet 70. As the follower moves into the slot 80, the pin 73 is adjacent the pawl 69. As the movement of the follower proceeds, the pin 73 forces the pawl 69 free of the ratchet 70, as will be understood upon reference to Fig. 2, which may be said to show the relation of the parts at the beginning of the adjusting movement and at the end of the operating movement.

Mounted to rotate with the shaft 27 is another hub 90 to which is secured at 91 a dial 92 having suitable graduations 93 at its periphery 94 for the purpose heretofore described. The hub 90 has a sleeve extension 95 to which a cam 96 is keyed as at 97 or otherwise secured for rotation therewith. An upright 98 welded as at 99 or otherwise suitably secured to the casing 20 has an opening 100 receiving the cam 96. Rotatably mounted on the sleeve extension 95 is a plate 102 having an arcuate slot 103 receiving a pin 104 extending from the cam 96. Pivotally mounted as at 105 on the upright 98 is a lever 106 having a cam follower or pin 107 urged radially inwardly by a spring 108 anchored to the upright 98 and lever 106. An electric circuit containing a heating element to be controlled by the mechanism about to be described includes wires or binding posts 110 and 111, leading to a switch 112. The switch includes a stationary contact 113 and a spring 114 to which is connected a switch blade 115 as by a connector 116 which may serve also to mount the spring and blade on the lever 106. The lever 106 is insulated as at 118 from the spring 114 and blade 115. The cam 96 has a notch 120 having an abrupt wall 121 and a relatively gently sloping wall 122. The plate 102 has a notch 123 adapted to register fully with the notch 120 when the cam 96 and plate 102 are in one limit of relative movement as shown in Fig. 6 as determined by the pin 104 and slot 103, and to be at least partially out of register therewith at the other limit as may be gathered upon reference to Fig. 4 showing the previously described switch construction.

Since the disk 92 and cam 96 are mounted for rotation with the shaft 27, it will be observed that when the dial 92 is rotated in the direction indicated by the arrow 127 (Fig. 6), the shaft 27 will turn in a direction to wind up the clock spring. At the initial rotation of the dial 92, the cam surface 122 forces the follower 107 radially outward against the force of the springs 108 and 114, the follower preventing rotation of the relatively loosely mounted plate 102, and the pin 104 moving in the slot 103. When the cam surface 122 has completed its camming action, the follower 107 is about to pass out of the notch 123, and the pin 104 is at the other limit of the slot 103. As the dial 92 is turned farther, the plate 102 rotates with the cam 96 and forces the follower farther outward and into a notch 130 in the upright 98, and continued rotation of the disk 92 causes the follower to ride on the outer periphery of the plate 102.

Before the follower 107 commences to pass out of the notch 123, the blade 115 engages the contact 113, closing the switch 112 and turning on the heating element controlled by said switch.

It will be observed that the lever 106 has an extension 135 (Fig. 1) adapted for engagement with the blades of two additional switches 136 and 137. The switch 136 is connected at 140 to a neutral point between the heating elements 141 and 142, and to a neutral wire 143 in the line 144. The switch 137 is connected in series with the switch 136 through a pilot lamp 146 and is also connected with a power wire 147 of the line. The switch 112 is connected to the power wire 147 and to the heating element 141. When the lever 136 closes the switch 112, the arm 135 of the lever at the same time closes the neutral wire and pilot lamp switches 136 and 137, respectively, simultaneously illuminating the lamp 146 and energizing the heating element 141.

When the lever 53 closes the switch 59, the switch 59 is connected by the wire 57 to another power wire 150, and by the wire 58 to the second heating element 142, so that, when the neutral switch 136 and the switch 59 are closed, the heating element 142 is energized.

Inasmuch as the neutral switch 136 can be closed only when the switch 112 is closed, it follows that either the heating element 141 alone is on or both of the heating elements 141 and 142 are on.

The switch 112 is closed and opened in the same manner as the switch 59, so that further description of this structure is unnecessary.

In operation, if it is desired to use only the heating element 141, the dial 92 is turned in the direction indicated by the arrow 127 until the datum point on the plate 35 indicates the length of time it is desired to use the element 141. The effect of the turning of the dial is to wind the spring of the clock 22, and the spring, when released, will proceed to unwind so that when the time interval for which the device is set expires the switch 112 will open, the blades of the switches 136 and 137 being spring-pressed against the lever arm 135 so as to swing to open positions when the switch 112 is opened.

When the dial 92 is rotated in a direction to close the switch 112, it has no effect whatever on the dial 32, since the pawl 69 is out of engagement with the ratchet 70, so that the ratchet merely idles relative to the dial 32 and the parts rotatable therewith. This insures against the turning on of the heating element 142 when the use of only the element 141 is desired. When it is desired to use both elements 141 and 142, assuming the switches 112 and 59 are open, the dial 32 is rotated in the direction indicated by the arrow 85 to the desired extent. As has been explained, the rotation of the dial 32 effects engagement between the pawl 69 and ratchet 70, causing the shaft 27 to rotate and wind the clock spring. Inasmuch as the dial 92 and cam 96 are rotatable with the shaft 27, they rotate at the same time that the dial 32 is rotated, so that rotation of the dial 32 results in the closing of all of the switches, thereby energizing both heating elements 141 and 142. The switch control mechanisms are so arranged that with the adjustment made as just explained they will all open instantaneously and at the same time.

However, it may be desired to have both elements 141 and 142 on at the same time for a given interval, say 10 minutes, for example, and only the element 141 on thereafter, say for a period of 30 minutes, for example. These results may be obtained as follows: With all the switches open the dial 32 is turned 10 graduations and, after the dial 32 is stopped, the dial 92 is turned 30 more graduations, bringing the setting of the dial 92 to 40. During this rotation of the dial 92, the pawl 69 will slip, so that the dial 32 will remain at its setting. The dial 92 is then released and all switches will remain closed for the selected period of use of both elements 141 and 142 as determined by the setting of the dial 32, and at the end of that period the switch 59 will open but the remaining three switches will remain closed until the dial 92 is returned to its off setting, whereupon said remaining three switches will open.

The clock 22 may be of a character to rotate the staff 23 once an hour or more or less slowly, as desired, depending upon the uses to which the same may be put.

In accordance with another form of the invention, there is provided a clock 152 having a staff 153 connected to a clock spring (not shown) and coupled at 154 with a shaft 155 which may be journaled as at 156 in the casing 157. Mounted on the shaft 155 for rotation therewith is a dial 158 having suitable graduations 159 and having a sleeve extension on which are formed cams 160a, 160b, and 160c, which may be identical. Each of these cams has a notch 161. A follower roller 162 adapted to ride on the periphery of each of said cams is journaled in a slot 164 in a spring switch blade 165 adapted to engage a contact 166 of a switch 167 and normally urged out of engagement with said contact by the resilience of the spring, which holds the followed in engagement with the periphery of the cam. The switch 167 is connected at 168 to a power wire 169 of the line 170 and at 168' to a heating element 171 and, by means of a wire 172, with a like switch controlled by the cam 160b, the latter switch being connected as at 173 with a neutral wire 174 of the line, completing a circuit. The switch controlled by the cam 160c is in series with a pilot lamp 175 connected to the wire 172 and to the power wire 169 and is in parallel with the switch 167.

It will thus be evident that these three switches are closed and opened simultaneously, and, when they are closed, the heating element 171 and pilot lamp 175 are energized. When the dial 158 is rotated in the direction indicated by the arrow 176 in Fig. 9, it winds the clock motor or spring and turns the cams so that the followers 162 ride on the peripheries thereof. I have shown in detail only one of the cams and switches, since all three are alike.

The casing 157 may have a datum point 177 for cooperation with the dial graduations 159, which may be in any desired units, such as minutes, so that the datum point and said graduations together indicate how long the clock spring will take to return the dial to the off or any other setting.

The dial preferably is in its off setting when the switch is open as shown in Fig. 10. It is apparent that as the dial is rotated in the direction to load the spring, as indicated by the arrow 176 in Fig. 9, each cam will force the follower 162 radially outward and close the switch 167. At such time, the roller 162 is at the bottom of its slot 164 (Fig. 10), and the corner 178 of the cam engages the roller so as to press the roller along a line to the left of the roller axis, thereby biasing the roller and hence the switch blade 165 toward and presently into engagement with the contact 166, closing the switch. The switch remains closed while the follower rides on or is tangent to the outer periphery of the cam. When the clock spring is being loaded by the dial, the cam holds the roller in the bottom of its slot.

As the clock spring rotates each cam as shown by the arrow 179 in Fig. 9, the cam moves the associated roller to the upper end of the associated roller slot. As soon as the cam point 178 passes above the axis of the roller, the opening pressure of the spring 165 will cooperate with the cam point in forcing the roller instantaneously to the bottom of the slot 164 and at such time the roller is precipitated into the cam notch 161 and the switch 167 is opened. The switch is thereby opened with despatch so that burning of the contact points is avoided, as in the previously described switch.

The dial 158 has an arcuate groove 182 into which a catch 183, slidably supported as on the casing 157, may be projected. The catch has a slot 184 through which a connecting pin 185 passes, and the casing has a slot 188 through which a manipulating handle 189 connected to the catch 183 extends. The groove 182 has a stepped interruption 192 providing an inner shoulder 193 and an outer shoulder 194. The catch 183 may be adjusted to be engageable with one or the other of said shoulders. As the clock spring rotates the dial 158, the shoulders approach the catch. The shoulder 194 is so arranged that when it is substantially engaged by the catch 103 the dial is at its off setting and the switch is open. This adjustment of the catch could be omitted, therefore, but is preferably employed in order that accidental movement of the dial in the wrong direction, which might injure the follower 162, may be prevented. When the catch is engaged with the shoulder 193, the switch is closed and will remain closed until the catch is manually released from the shoulder 193.

A bushing 200 about the shaft 155 is disposed within a cam 201 to which is loosely keyed as at 202 a dial 203 having suitable graduations 204 in minutes or other suitable units, for cooperation with a suitable datum point 205 on the casing. A plate 207 has a pin 208 engaged in a recess 209 in the cam to rotate the same. Pivotally connected at 211 to the plate 207 is a pawl 212 having a tooth 213 urged by a spring 214 into engagement with a ratchet 215 keyed as at 216 to the shaft 155 for rotation therewith. The dial 203 has a recess 220 in which a lug 221 on the pawl 212 projects. The cam 201 has a shoulder 223 engageable with said lug.

The cam 201 and switch means 224 associated therewith are identical with those previously described in connection with the form of the invention appearing in Figs. 8 to 15 and, accordingly, the previous description will suffice. The switch 224 is connected as by a wire 225 with another power wire 226 of the line 170, and by a wire 227 with another heating element 228 which, like the heating element 171, is connected to the neutral switch wire 12.

When the dial 158 is turned to wind the clock spring, the ratchet 215, being mounted to rotate with the shaft 155, turns and, through its engagement with the pawl 212, urged into engagement therewith by the spring 214, turns the plate 207. The plate 207, by means of its pin 208, turns the cam 201 so that all four cams are adjusted alike and hence all four switches will close together. Since there is no load tending to resist turning of the dial 203 at this time, the pressure of the spring 214 will be sufficient to prevent the inertia of the dial 203 from taking up the slack at the loose connection 202 between the dial 203 and the cam 201, so that the shoulder 223 will not kick the lug and thus will not withdraw the pawl from the ratchet.

Thus when it is desired to energize both heating elements 171 and 228 it is necessary merely to adjust the dial 158, and when, with such a setting, the catch 183 engages the shoulder 193, both elements will be on indefinitely at the will of the operator.

If it is desired that only the element 171 be energized the dial 158 is adjusted to an extent to maintain the element 171 in operation for the desired period, and then the dial 203 is turned in the reverse direction as indicated by the arrow 230 in Fig. 14. Since this movement will be resisted by the clock spring, the dial 203 will take up the slack in the loose connection 202 and, at that time, the dial shoulder 223 will kick the dog 221 to such an extent as to remove the pawl tooth 213 from the ratchet 215. The turning of the dial 203 is continued until it is at its off setting, when its switch 224 will be open. If desired, instead of the procedure just described, the dial 203 may be held stationary while the dial 158 is turned to the desired setting.

If it is desired to operate both elements 171 and 228 for a given period and thereafter to operate only the element 171, the dial 158 is adjusted to a point corresponding to the total length of time the element 171 is to operate, the dial 203 being allowed to rotate with the dial 158. After the dial 158 reaches its set position, the dial 203 is turned reversely to such a point that its graduations indicate the desired length of time its switch 224 will remain closed. Now when, in response to the operation of the clock spring, the dial 203 reaches its off setting, its switch 224 will open, thereby de-energizing the heating element 228. The heating element 171 will remain energized until the dial 158 reaches its off setting.

In order to prevent tampering or accidental reverse movement of the dial 203, I provide said dial with an arcuate groove 235 which is interrupted, providing an abutment 236 engageable with a dog 237, which may be mounted as at 238 on the casing, to prevent movement of the dial 203 in the direction indicated by the arrow 230 beyond its off setting.

It will be seen from the foregoing that I have provided a simple quick-break switch construction for providing low and high heat for desired periods of time.

Any number of additional heating elements may be employed, as will be understood by those skilled in the art.

The construction is extremely simple yet efficacious, and involves a minimum of parts which may be confined in a small space and yet are readily accessible for adjustment, repair and replacement.

Various changes coming within the spirit of the invention may be suggested by those skilled in the art, and hence I do not wish to be limited to the specific forms shown or uses mentioned, except to the extent indicated by the appended claims, which are to be interpreted as broadly as the state of the art will permit.

I claim:

1. In a device of the class described, a switch, a clock having a spring, a shaft rotatable by said spring, said shaft being rotatable in a reverse direction to energize said spring, means operative upon the turning of said shaft in the reverse direction to close said switch and maintain said switch closed until the shaft has been rotated by said spring to a pre-determined position, means cooperating with said switch and the switch-closing means for providing a quick-break for said switch when the said shaft reaches said position, and means independent of said switch for preventing movement of said shaft beyond said position in the direction of its rotation by said spring.

2. In a control for an electric range including a pair of electrically heated heating elements, a circuit for said elements, switches for the respective elements and included in said circuit, means controlled by a single member for maintaining both of said switches closed for a pre-determined period, means for opening one of said switches at the close of said period, means for opening the other of said switches at the close of an ensuing pre-determined period, and means for rendering the last named means inoperative.

3. Timing mechanism comprising a motor, a shaft rotated thereby, a cam rotatable with said shaft, a switch having a blade with a follower engageable with said cam, said cam being movable to rotate said shaft so as to close said switch and load said motor, said motor being thereafter operative to turn said shaft and cam, said cam having a notch adapted to be alined with said follower after a pre-determined period of operation of said shaft by said motor, means urging said follower into said notch to open said switch, and means independent of said follower for preventing further rotation of said shaft by said motor when said switch is open.

4. Timing mechanism comprising a motor, a shaft rotated thereby, a cam rotatable with said shaft, a switch having a blade with a follower engageable with said cam, said cam being movable to rotate said shaft so as to close said switch and load said motor, said motor being thereafter operative to turn said shaft and cam, said cam having a notch adapted to be alined with said follower after a pre-determined period of operation of said shaft by said motor, means urging said follower into said notch to open said switch, and means independent of said timing mechanism for delaying such alinement.

5. Timing mechanism comprising a motor, a shaft rotated thereby, a cam rotatable with said shaft, a switch having a blade with a follower engageable with said cam, said cam being movable to rotate said shaft so as to close said switch and load said motor, said motor being thereafter operative to turn said shaft and cam, said cam having a notch adapted to be alined with said follower after a pre-determined period of operation of said shaft by said motor, means urging said follower into said notch to open said switch, means for preventing further rotation of said shaft by said motor when said switch is open, and means independent of said timing mechanism for delaying such alinement.

6. Timing mechanism comprising a motor, a shaft rotatable by said motor, a pair of devices for making available portions of a supply of energy, means including a pair of manually adjustable members cooperating with said shaft for controlling the respective devices, means cooperating with each member and the associated device to render said device inoperative when said member is in one position, said members being operative upon manual rotation thereof in the direction opposite to the direction of rotation of said shaft by said motor, to render said devices operative each for a period determined by the extent of rotation of the respective member, one of said members having a one-way overrunning drive connection with said shaft and the other member being fixed to said shaft, said one member being adjustable with said shaft in said opposite direction to a selected extent and said other member being thereafter adjustable with said shaft in said opposite direction to a selected extent, said shaft during the latter adjustment moving independently of said one member, said shaft, when turned by said motor, turning both of said members, whereby the period of operation of each device will correspond to the original adjustment of its associated member, and means automatically operative after one of said devices has become inoperative for preventing the other device from becoming inoperative.

WILLIAM D. HALLORAN.

CERTIFICATE OF CORRECTION.

Patent No. 2,313,065.   March 9, 1943.

WILLIAM D. HALLORAN.

It is hereby certified that error appears in the printed specification of the above numbered patent requiring correction as follows: Page 2, second column, line 18, for "is" read --in--; page 3, second column, line 40, for "dial 82" read --dial 92--; line 62, for "followed" read --follower--; page 4, second column, line 18, for "wire 12" read --wire 172--; and that the said Letters Patent should be read with this correction therein that the same may conform to the record of the case in the Patent Office.

Signed and sealed this 27th day of April, A. D. 1943.

(Seal)

Henry Van Arsdale,
Acting Commissioner of Patents.